United States Patent [19]
Weigele et al.

[11] 3,942,207
[45] Mar. 9, 1976

[54] VEHICLE WASHING APPARATUS
[76] Inventors: Gebhard Weigele, Am Schonblick 1a, 8901 Tafertingen; Johann Sulzberger, Radegundis 11, 89 Augsburg 28, both of Germany
[22] Filed: Oct. 3, 1974
[21] Appl. No.: 511,539

[30] Foreign Application Priority Data
Oct. 4, 1973 Germany............................ 2349861

[52] U.S. Cl............................ 15/53 AB; 15/DIG. 2
[51] Int. Cl.² ........................................... B60S 3/06
[58] Field of Search............ 15/DIG. 2, 21 D, 21 E, 15/53, 97, 21 R, 21 E, 53 A, 53 AB

[56] References Cited
UNITED STATES PATENTS

| | | | |
|---|---|---|---|
| 3,233,264 | 2/1966 | Nickl et al............................ | 15/21 E |
| 3,601,833 | 8/1971 | Takeuchi............................ | 15/21 E |
| 3,633,231 | 1/1972 | Capra................................. | 15/21 E |
| 3,793,667 | 2/1974 | Capra................................. | 15/21 E |
| 3,867,735 | 2/1975 | Takeuchi............................ | 15/21 D |

FOREIGN PATENTS OR APPLICATIONS
1,809,764   6/1970   Germany.......................... 15/DIG. 2

*Primary Examiner*—Edward L. Roberts
*Attorney, Agent, or Firm*—Woodhams, Blanchard and Flynn

[57] ABSTRACT

Vehicle washing apparatus having two suspended brushes rotatable about generally vertical axes which are forced apart during passage of the vehicle between the brushes wherein the brushes are initially inclined towards the vehicle and are swung into an oppositely-inclined position by pressure against the vehicle, whereby the front and rear surfaces of the vehicle are more efficiently cleaned.

7 Claims, 12 Drawing Figures

VEHICLE WASHING APPARATUS

FIELD OF THE INVENTION

This invention relates to an apparatus for washing the front, side and rear surfaces of vehicles moving relative to the apparatus, comprising at least two rotating brushes whose axes of rotation extending in vertical planes are mounted to swing about horizontal pivot axes extending transversely of the longitudinal axis of the vehicle, each of the two brushes being movable from a basic position in the vicinity of the longitudinal axis of the vehicle for washing the front surface along a path extending transversely of this longitudinal axis into a lateral position remote from the longitudinal axis of the vehicle, in which it also washes the side surface of the vehicle, and thereafter into its basic position again.

BACKGROUND OF THE INVENTION

In a known apparatus of this kind, the brushes are so suspended that in the basic position of the brushes their axes of rotation are vertical. In the basic position, the two brushes are brought as close to one another as possible and are located in the vicinity of the longitudinal axis of the vehicle. Both in conveyor belt washing systems and in gantry washing systems the vehicle carries out a continuous relative movement with respect to the brushes during the washing operation. In conveyor belt systems, the vehicle is drawn through the brushes which are mounted in a stationary frame, while in gantry washing systems the vehicle is stationary and the gantry bearing the brush is moved. In both cases the front surface of the vehicle strikes first against the rotating brushes. Since the vehicle moves on continuously, the contact pressure of the brushes against the front surface is intensified. The intensified contact pressure is utilized to move the two brushes in opposite directions out of their basic position into a lateral position by means of suitable servomotors along a path extending transversely of the longitudinal axis of the vehicle. In the process the brushes wash the front surface of the vehicle. Since, however, the vehicle also moves on while the brushes move outwardly, the brush is carried along by the vehicle at its lower end and is swung out about its pivot axis. When this happens, however, the swinging-out must take place only within a limited small angle, since otherwise the front surface of the vehicle is only washed in its uppermost zone and the contact pressure of the brushes moreover becomes too strong and damage to the vehicle is to be feared. For this reason, in known washing equipment, the brushes must be moved apart comparatively rapidly during the washing of the front surface, whereby the washing effect suffers.

The problem underlying the invention is to provide a vehicle washing apparatus of the kind mentioned at the beginning which in particular makes better cleaning of the front surface of the vehicle possible and also a higher rate of advance of the vehicle.

According to the invention, this is achieved in that in the basic position of the brushes their axes of rotation are inclined at an acute angle with respect to the vertical and in fact with their upper ends in the direction of relative movement of the vehicle.

Thus, in the new apparatus, the brushes no not hang vertically in their basic position, but their axes of rotation are so inclined obliquely with respect to the front surface of the vehicle that the lower end of the brush is closer to the vehicle than the upper end. When the vehicle strikes against the brush, it is first swung out of its inclined position into its vertical position and finally into an oppositely directed inclined position during the forward movement of the vehicle. Consequently, a double angle of swing is available until the brush has reached its position of greatest possible inclination during the forward movement of the vehicle. Owing to the doubling of the angle of swing, it is possible to move the brushes apart at a lower speed during the washing of the front surface. This results in a better washing effect. Moreover, it would also be possible to retain the existing speed with which the brushes are moved apart and double the rate of advance of the vehicle instead. The optimum solution would probably be one in which, compared with known washing equipment, both the speed with which the brushes are moved apart is reduced a little and the rate of advance of the vehicle is increased. Irrespective thereof, howevere, a better washing effect is moreover also achieved in the lower zone of the front surface of the vehicle.

With each brush there is advantageously associated a second brush arranged behind it in the direction of movement of the vehicle and the two brushes of a pair of brushes formed in this way are suspended to swing about a common pivot axis, the axes of rotation of the brushes of a pair of brushes moreover having their upper ends inclined towards one another. With this construction, a particularly good washing effect is obtained at all the surfaces of the vehicle. The brushes arranged in the first position in the direction of movement of the vehicle wash the front surface, then both brushes wash the side surface and finally the second brushes wash the rear surface of the vehicle.

BRIEF DESCRIPTION OF THE DRAWINGS

Details of the invention are described more fully with reference to embodiments illustrated in the drawings.

In the drawings.

DETAILED DESCRIPTION

Both embodiments show a conveyor belt washing apparatus in which, therefore, the vehicle 8 is moved in the direction A and the washing apparatus is stationary. These constructions, however, also apply correspondingly to a gantry washing apparatus in which the vehicle is stationary and the washing apparatus is moved in the direction opposite to the direction of the arrow A.

Figure 1:
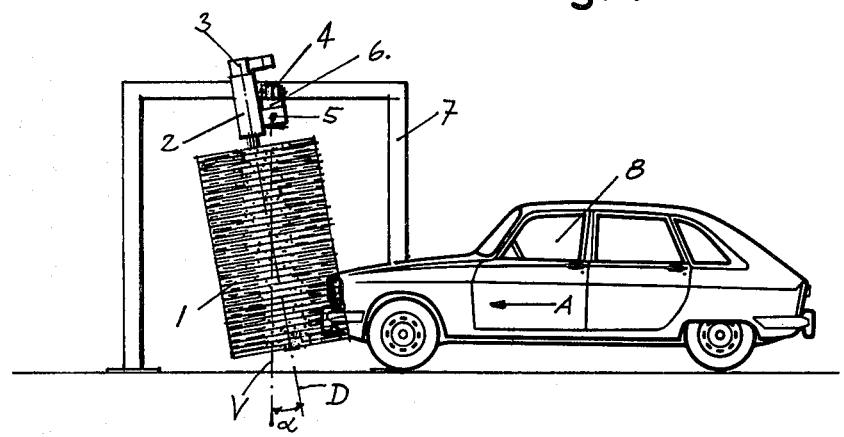
FIGS. 1 and 2 show a first embodiment in side view with brushes in two different working positions.
Figure 2:
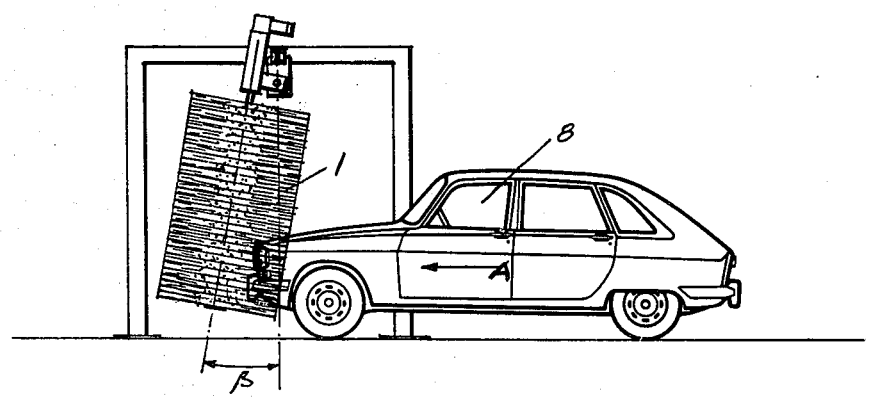

The axes of rotation D of the two brushes 1 are each mounted in a housing 2. A motor 3 is provided for driving each brush. Provided on a frame 7 is a runway rail 4 extending transversely of the direction of movement A of the vehicle. Two trolleys 6 can be moved along this runway rail 4. The housings 2 are mounted on the trolleys 6 to swing about the axes 5 likewise extending transversely of the direction of movement of the vehicle. In the embodiment shown in FIGS. 1 to 4, the pivot axis 5 is arranged outside the axis of rotation D, so that the brushes adopt the inclined attitudes shown in FIGS. 1 and 3 in their basic position. Their axes of rotation D are then inclined at an acute angle $\alpha$ with respect to the vertical and in fact with their upper ends in the direction of movement A of the vehicle 8. This inclined position of the axes of rotation D could if necessary also be achieved by means of a counterweight or else by spring force.

Figure 3:
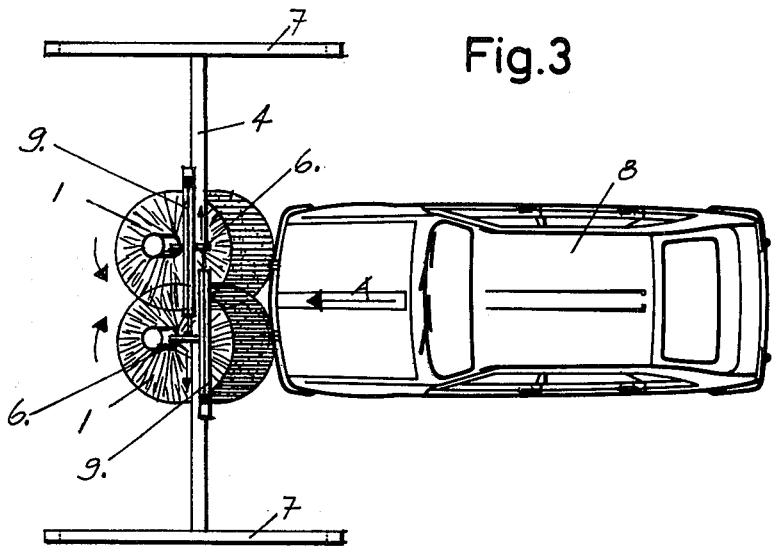
FIGS. 3 and 4 are the relevant plan views.
Figure 4:
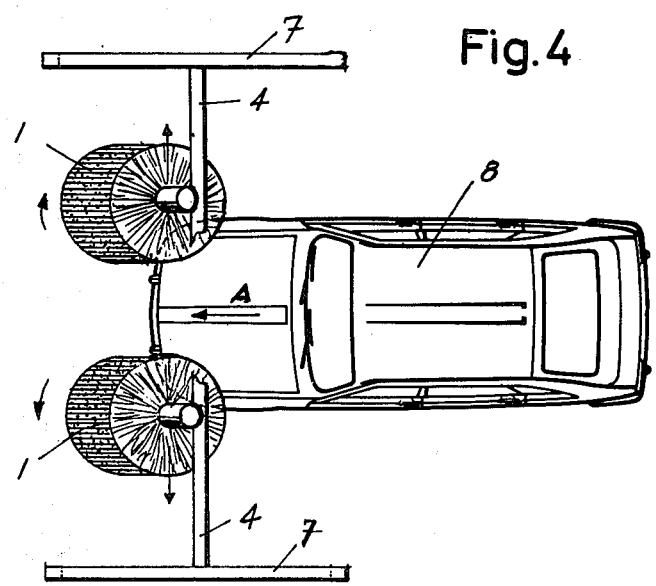

In their basic position, the two brushes are arranged in the vicinity of the longitudinal axis of the vehicle, as can be seen in particular from FIG. 3. When the vehicle 8, being continuously moved along, strikes against the brush with its front surface, the contact pressure of the brushes increases. Via means known per se, for example an output meter of the motor 3, a torque measurement or through contacts which are actuated in dependence upon the inclination of the brush when it is swung, a suitable driving device is set in action and moves the two brushes in opposite directions out of their basic position into their lateral position. Pneumatic or hydraulic cylinders 9, for example, may be provided for this purpose, but it is also possible to employ electric motors with a belt drive, or a suitable friction roller drive.

While the brushes move outwardly into their lateral position, the vehicle moving on continuously pushes the brushes in front of it. In consequence, the inclined position of their axes of rotation changes from the position shown in FIG. 1 to the position shown in FIG. 2, in which the upper ends of the axes of rotation are inclined to the rear in the direction opposite to the direction of travel. In a position of this kind, the contact pressure of the brushes in the upper zone of the front surface gradually increases, whereas in the lower zone of the front surface there is only an inadequate bearing action. The brushes have also already approximately reached their lateral position. Due to the position provided according to the invention for the axes of rotation, in which they are inclined by the angle $\alpha$, the brushes can not only swing out as heretofore by the angle $\beta$ during the washing of the front surface, but by an angle corresponding to the sum of $\alpha$ and $\beta$. In this way, a longer time is available for the washing of the front surface and the washing effect is improved. A further improvement of the washing effect occurs in particular in the lower zone of the front surface due to the inclined position of the brushes in accordance with the invention. Moreover, the speed of the vehicle may also be increased in addition if necessary, since the brushes can be swung in a larger angular range while the vehicle is moving forward.

After the brushes have reached their lateral position, they wash the side surfaces of the vehicle in this position. In this case, the contact pressure may be produced by means of springs (not shown). Likewise, after the brushes have washed the side surfaces, they can be moved back again into their basic position by spring force and wash the rear surface of the vehicle in the process. If necessary, it is also possible to provide more brushes which serve specially for washing the rear surface.

Figure 5:
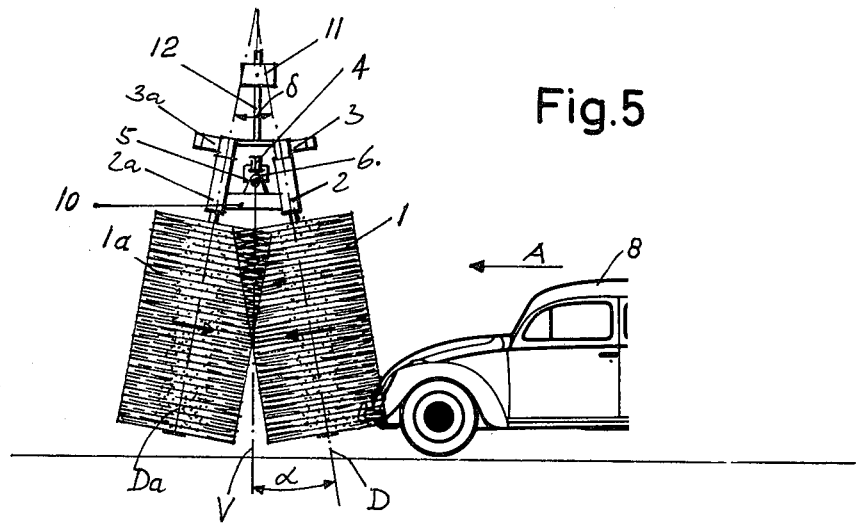
FIGS. 5 to 7 show a second embodiment in side view with different working positions of the brushes.
Figure 6:
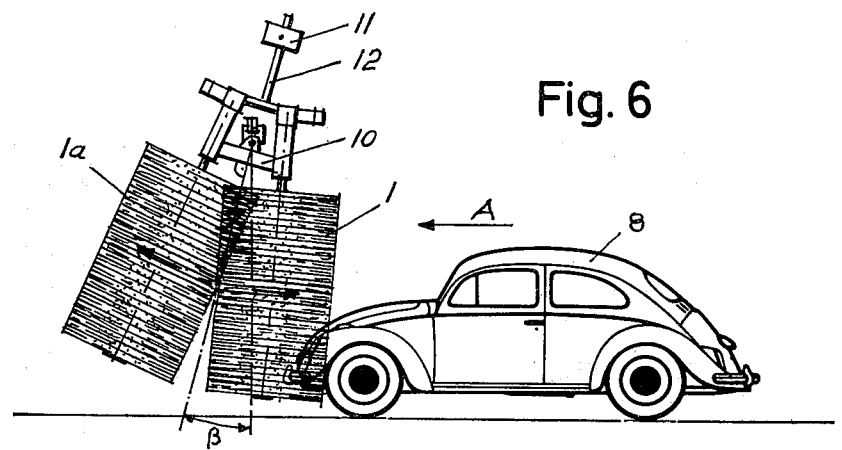
Figure 7:
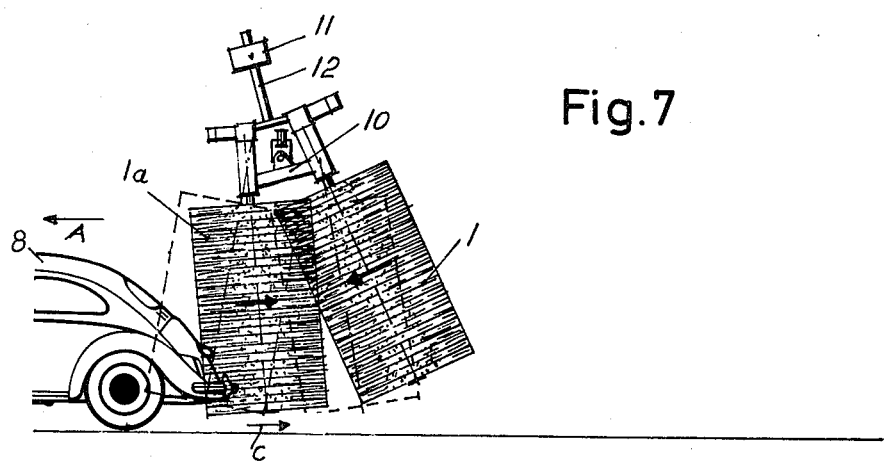

The embodiment shown in FIGS. 5 to 7 is particularly advantageous. With each brush 1 there is associated a brush 1a arranged behind it in the direction of movement A of the vehicle 8. The two brushes 1 and 1a form a pair of brushes and their housings 2 and 2a are interconnected by a crosspiece 10. The two brushes of a pair are suspended to swing from the trolley 6 by means of the common pivot axis 5. The axes of rotation D and Da of the brushes 1, 1a of a pair have their upper ends inclined towards one another. They advantageously enclose an angle $\delta$, which is twice as large as the angle $\alpha$ which the first brush 1 encloses in the basic position with respect to the vertical V, the pivot axis 5 being arranged on the bisector of the angle between the axes of rotation. With a similar design of the two brushes 1 and 1a and of their drives 3 and 3a, the two brushes are therefore in equilibrium in the inoperative or rest position, as shown in FIG. 5.

Operation as regards the washing of the front surface is the same as in the case of the first described embodiment. The front surface is washed only by the brushes 1. In this instance, the contact pressure can also be adjusted in the desired manner by means of a counterweight 11 slidable and fixable on the rod 12. After the front surface has been washed, both brushes wash the side surfaces. In so doing, they rotate with advantage in opposite directions. Due to the opposite inclination of the axes of rotation D and Da, the vehicle is washed at the side surfaces in two different intersecting directions and a particularly thorough washing effect is obtained in this way.

After the side surfaces have been washed, the second brush 1a of each pair of brushes washes the rear surface of the vehicle, as shown in FIG. 7. It is advantageous to impart to the second brush 1a a rotary movement in the same direction with respect to the direction in which it is moved on on the surface of the vehicle, as can be seen in particular from FIG. 11. With this movement in the same direction the brush assists its moving on in the direction of the longitudinal axis of the vehicle. Since it rolls on the surface of the vehicle similarly to a driven wheel, the brush "climbs" on the rear surface of the vehicle, so that the pair of brushes is swung rearwardly in addition in the direction c. As a result, during the forward movement of the vehicle, the pairs of brushes can then swing back in the direction opposite to the direction of the arrow c into their position of equilibrium shown in dashed lines and consequently follow the vehicle. A particularly intensive washing of the rear is consequently obtained by means of the brushes 1a.

Figure 8:
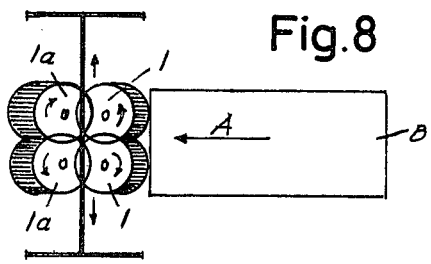
FIGS. 8 to 12 are a diagrammatic representation in plan view of the washing operation in an apparatus according to FIGS. 5 to 7.
Figure 9:
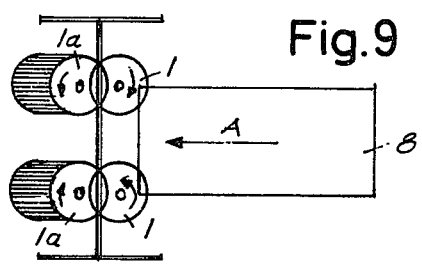
Figure 10:
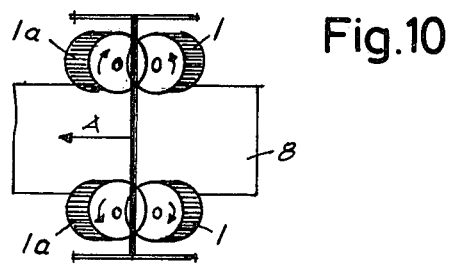
Figure 11:
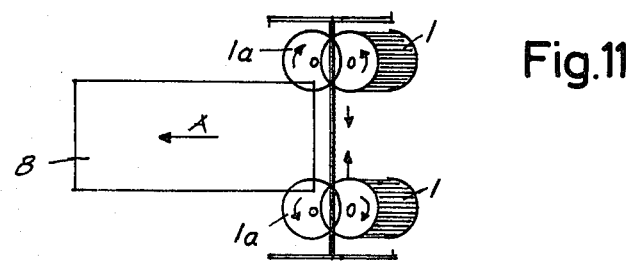
Figure 12:
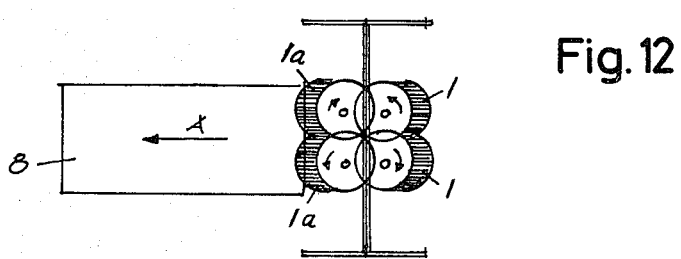

In order to optimize the washing effect, it may be advantageous to reverse the rotary movement of the brushes several times. Thus, as can be seen from FIG. 8 the first brush 1 of each pair of brushes is advantageously first driven in the opposite direction in relation to the progressive movement of the brush with respect to the front surface during the washing of this surface. This oppposite movement exerts a braking force in relation to the moving on of the brush. As soon as the brushes approach the wings during their oppositely directed outward movement, it may be advantageous to reverse the direction of rotation into one in the same direction, as shown in FIG. 9. In this way, the two brushes 1 are given an onward driving movement and they "climb" over projecting body parts, such as, for example, forwardly extending wings, overriders, etc. During the washing of the side surface, the first brush is again driven in the opposite direction, while the second brush rotating in the opposite direction then performs a movement in the same direction, as can be seen from FIG. 10. This movement in the same direction is then retained during the washing of the rear surface (FIGS. 11 and 12).

The embodiments of the invention in which an exclusive property or privilege is claimed are defined as follows:

1. An apparatus for washing front, side and rear surfaces of vehicles wherein a relative movement occurs between said apparatus and said vehicle, comprising:
   a frame;
   at least two brushes rotatably mounted on said frame about generally vertical axes of rotation which lie in planes parallel to the longitudinal axis of said vehicle and are initially inclined at an acute angle ($\alpha$) with respect to the vertical in the direction of the relative movement of said vehicle relative to said frame whereby the bottom of said brushes are initially inclined toward the front of said vehicle prior to engagement of said front of said vehicle with said brushes;
   pivot means for pivotally supporting each of said two brushes for pivotal movement about horizontal axes transverse to said longitudinal axis of said vehicle; and
   track means on said frame for supporting said brushes for movement between positions adjacent said longitudinal axis of said vehicle for washing said front and rear surfaces of said vehicle along a path extending transversely of said longitudinal axis of said vehicle and remote from said longitudinal axis of said vehicle for washing said side surfaces of said vehicle.

2. An apparatus according to claim 1, wherein with each of said two brushes there is associated a second brush arranged behind it in the direction of movement (A) of the vehicle, said two brushes of a pair of brushes formed in this way are suspended to swing about a common horizontal pivot axis, and the axes of rotation of said brushes of a pair of brushes have their upper ends inclined towards one another.

3. An apparatus according to claim 2, wherein said axes of rotation of said brushes of a pair of brushes enclose between them an angle ($\delta$) twice as large as said angle ($\alpha$) relative to the vertical when the first brush is in the initial position, said common horizontal pivot axis being arranged on the bisector of the angle between the axes of rotation.

4. An apparatus according to claim 3, including a slidable and fixable counterweight arranged on a rod extending in the direction of the bisector of the angle on the side of the common horizontal pivot axis opposite the brushes.

5. An apparatus according to claim 2, wherein said second brush of each pair of brushes is rotated during a washing of the rear of the vehicle in opposite directions, said second brush arranged on the right side of the vehicle looking from the rear toward the front thereof is given a clockwise rotary movement and said second brush arranged on the left side a counterclockwise movement.

6. An apparatus according to claim 5, wherein during the washing of the front surface of said vehicle, said brushes of each pair of brushes are first pivoted about said common horizontal axis in the same direction a little before reaching the fenders of said vehicle and are further pivoted in the opposite direction during a washing of the side surfaces of said vehicle.

7. An apparatus according to claim 2, wherein said two brushes of each pair of brushes are driven in opposite directions of rotation relative to each other at all times.

* * * * *